US006802228B2

(12) United States Patent
Liang

(10) Patent No.: US 6,802,228 B2
(45) Date of Patent: Oct. 12, 2004

(54) MICROSAMPLE ANALYSIS SYSTEM USING SYRINGE PUMP AND INJECTION PORT

(76) Inventor: Dong C. Liang, 4882 Ontario Street, Vancouver, British Columbia (CA), V5V 3H5

( * ) Notice: Subject to any disclaimer, the term of this patent is extended or adjusted under 35 U.S.C. 154(b) by 65 days.

(21) Appl. No.: 10/107,068

(22) Filed: Mar. 28, 2002

(65) Prior Publication Data

US 2002/0190202 A1 Dec. 19, 2002

Related U.S. Application Data

(60) Provisional application No. 60/279,332, filed on Mar. 29, 2001.

(51) Int. Cl.[7] ............................ G01N 35/10; B01L 3/02

(52) U.S. Cl. .................................................... 73/864.21

(58) Field of Search ......................... 73/864.01, 804.21, 73/864.81; 141/21

(56) References Cited

U.S. PATENT DOCUMENTS 4,577,517 A * 3/1986 Knight .................... 73/864.81
4,633,413 A * 12/1986 Caveney et al. ............ 364/500
4,713,974 A * 12/1987 Stone ....................... 73/864.23
4,835,109 A * 5/1989 Trisciani et al. ............ 436/178
4,836,038 A * 6/1989 Baldwyn ................. 73/864.21
4,939,943 A * 7/1990 Strohmeier .............. 73/864.21
5,988,236 A * 11/1999 Fawcett ...................... 141/130

OTHER PUBLICATIONS

Tecan, Cavro (trade mark) XL 3000, "The Most Flexible" Tecan Systemcs Series Syringe Pumps, Specification (no printed date).*

* cited by examiner

*Primary Examiner*—Hezron Williams
*Assistant Examiner*—Charles Garber

(57) ABSTRACT

This invention pertains to a method of chemical analysis by full automation of a microsyringe pump autosampler apparatus. The microsampling feature of this invention makes it possible to analyze small sample volumes undiluted. The time for sample preparation is minimized by the use of the autosampler apparatus, which performs the tasks of aspirating, mixing, and dispensing sample mixtures, and washing the apparatus, in a single sequence of steps.

22 Claims, 5 Drawing Sheets

MICROSAMPLE ANALYSIS SYSTEM USING SYRINGE PUMP AND INJECTION PORT

RELATED APPLICATIONS

This application claims the benefit of prior filed provisional application, Application No. 60/279,332 filed Mar. 29, 2001.

FIELD

The present invention is an automated system for preparing and delivering sample mixtures to a chemical analyzer capable of accommodating liquid sample introduction, as well as washing the chemical analyzer.

BACKGROUND OF THE INVENTION

Atomic absorption spectroscopy (AAS) is a common, well known technique for elemental chemical analysis. The most common AAS apparatus uses a flame as a means of atomizing the sample. This apparatus setup is known as flame AAS, or FAAS. Typically, sample is introduced into the flame by means of a nebulizer. FAAS typically needs at least a 2–10 mL volume of sample in order to run an analysis.

The "throughput" of an analytical technique is a performance characteristic and is determined primarily on how many samples can be analyzed in a given period of time. The throughput of FAAS is generally poor, because there are requirements of sample preparation and apparatus cleaning that go along with each sample analysis. For example, the sample to be analyzed is often mixed with other agents (suppressors, matrix modifiers, releasing agents, etc.) before it is introduced for analysis. In addition, the nebulizer system must be washed between successive sample introductions in order to avoid memory effects due to remnants of previously analyzed samples.

Some FAAS systems are equipped with autosampler systems. These autosamplers can be programmed by the operator to analyze samples without operator intervention. The samples to be analyzed must be located in specialized sample trays whose locations are known by the autosampler. Such automated devices do reduce the amount of time and effort required by the operator for analysis of samples, but they do not improve the throughput performance of the instrument since the requirements of sample preparation and washing still exist. Therefore, there is a need for an analysis method that not only automates sample analysis, but also automates washing, and sample preparation.

In terms of the application of FAAS to pharmaceutical and biomedical research, samples from drug discoveries are often as small as 10–200 $\mu$L, and are therefore very difficult, if not impossible, to analyze by FAAS using direct sampling from a microplate. In most cases, these small volume samples require dilution to bring the sample into a useful range, which dilutes the analyte concentration and sacrifices sensitivity. Ion channel assays (e.g. determinations of potassium, calcium, sodium, chloride, or rubidium concentrations in the ion channels) are subject to this same kind of limitation. As such, there is a need for a sample analysis system which allows small sample sizes (e.g. in the order of 10–200 $\mu$L) to be analyzed without dilution.

Traditionally, analytical applications for ion channel analysis have fallen on either of the extremes of accuracy or speed. Presently ion channel assays are not fully automated to maximize sample throughput. The patch-clamp method is indisputably the most accurate, but it has a low throughput speed. Fluorescent dye measurements offer unsurpassed analysis speed, but suffer from low accuracy. Furthermore, other techniques that manage to sit in the middle ground between high accuracy and fast speed do possess equally limited disadvantages. The radioactive $^{86}Rb^{+}$ efflux assay, for example, is a relatively unsafe and inconvenient technique in that the radioactive isotopes required are harmful to human operators, the half-life of the isotopes restricts the time duration of experiments, and there are radioactive waste disposal considerations to be dealt with.

Recently, Georg C. Terstappen described a method of using FAAS for an ion channel assay of rubidium. His method involved the dilution of the original sample 10–25 fold with an ion suppressor in order to obtain a sample volume that could be analyzed with FAAS. Such a dilution results in a significant loss in sensitivity for the analysis (10–25 fold). In addition, the dilution was performed manually, not automatically, so the sample throughput of the technique was significantly decreased. Therefore, there is a need in the analytical instrumentation industry to develop innovative analysis solutions for ion channel assays.

For example, potassium ion ($K^{+}$) channels are critical aspects of many cellular processes within the human body. $K^{+}$channel modulators offer significant therapeutic solutions to a variety of pathophysiological conditions. Therefore, innovations in the evaluation of $K^{+}$channel activity would greatly support both academic and pharmaceutical research in this area. As such, there is a need for a method to quickly, easily, and accurately analyze ion channel assays, as well as pharmaceutical drug candidates, such as for ones that block the hERG K+ channel (which are vital for regulating the balance of pro- and anti-arrhythmic potentials) and prolong the QT interval.

As a result it is an object of this invention to provide a safe and reliable compromise between the traditional one-sided extremes of speed and accuracy associated with ion channel assay analysis. It is a further object of this invention to provide an analysis method that not only automates sample analysis, but also automates washing, and sample preparation, such that typical low sample throughput of most instruments, such as FAAS, is improved. It is still a further object of this invention to provide an analysis method that enables microsampling without dilution, such that minimum sample sizes for FAAS analysis can be lowered.

SUMMARY OF THE INVENTION

The present invention is a fully automated chemical analysis system and is particularly well suited for pharmaceutical drug discovery and biomedical research applications (for example, ion channel assays), compromised in part by an electronically controlled microsyringe pump, an injection port, a nebulizer and a FAAS instrument. The different components of the system are connected by tubing, allowing solutions to be exchanged between the various components of the system. The chemical analysis system further includes an autosampler, such as the XYZ autosampler available from Aurora Instruments, an array of sample microplates, and an array of solution containers (for standards, modifiers, buffers, suppressors, etc.). The chemical analysis instrument used in this invention can be any one of a multitude available on the market today, as long as it can accommodate liquid sample introduction. The FAAS instrument, however, will likely be the most useful chemical analysis instrument for many applications.

One advantage of the present invention is that it allows for a direct injection of small volumes of samples (in the order of 10–200 μL) into the nebulizer of a FAAS. As the invention permits the analysis of microliter sample volumes, the need to dilute samples and sacrifice sensitivity is avoided. The use of the electronically controlled microsyringe pump allows for accurate analysis of such small sampling volumes.

In contrast to the prior art, the use of electronically controlled microsyringe pump and autosampler enables the time-consuming task of aspirating, mixing, and dispensing sample mixtures, as well as washing the sampling apparatus to be performed in a single sampling step, resulting in an increased throughout. The throughput of the apparatus may be further increased by the employment of multiple sample channels simultaneously. As a result, a further advantage of the present invention is that it can incorporate any number of parallel chemical analysis instrument channels (from one up to as many as is practically achievable).

A further advantage of the present invention is the ability of the apparatus to perform auto-dilutions of solutions and calibrations from a single standard. The full automation of auto-dilutions and calibrations relieves the human operator of the time and effort normally required of conventional chemical analysis systems on the market.

Still, a further advantage of the present invention is that the washing aspect of that sampling step performed by the microsyringe pump and injection port is very effective at reducing memory efforts (contamination problems between successive samples due to residues of past samples left in the instrument). Memory effects are a common concern with most automated chemical analysis systems.

BRIEF DESCRIPTION OF THE DRAWINGS

Further features and advantages of the invention will be apparent from the following detailed description, given by way of example, of a preferred embodiment taken in conjunction with the accompanying drawings, wherein.

DETAILED DESCRIPTION OF THE INVENTION

Figure 1:
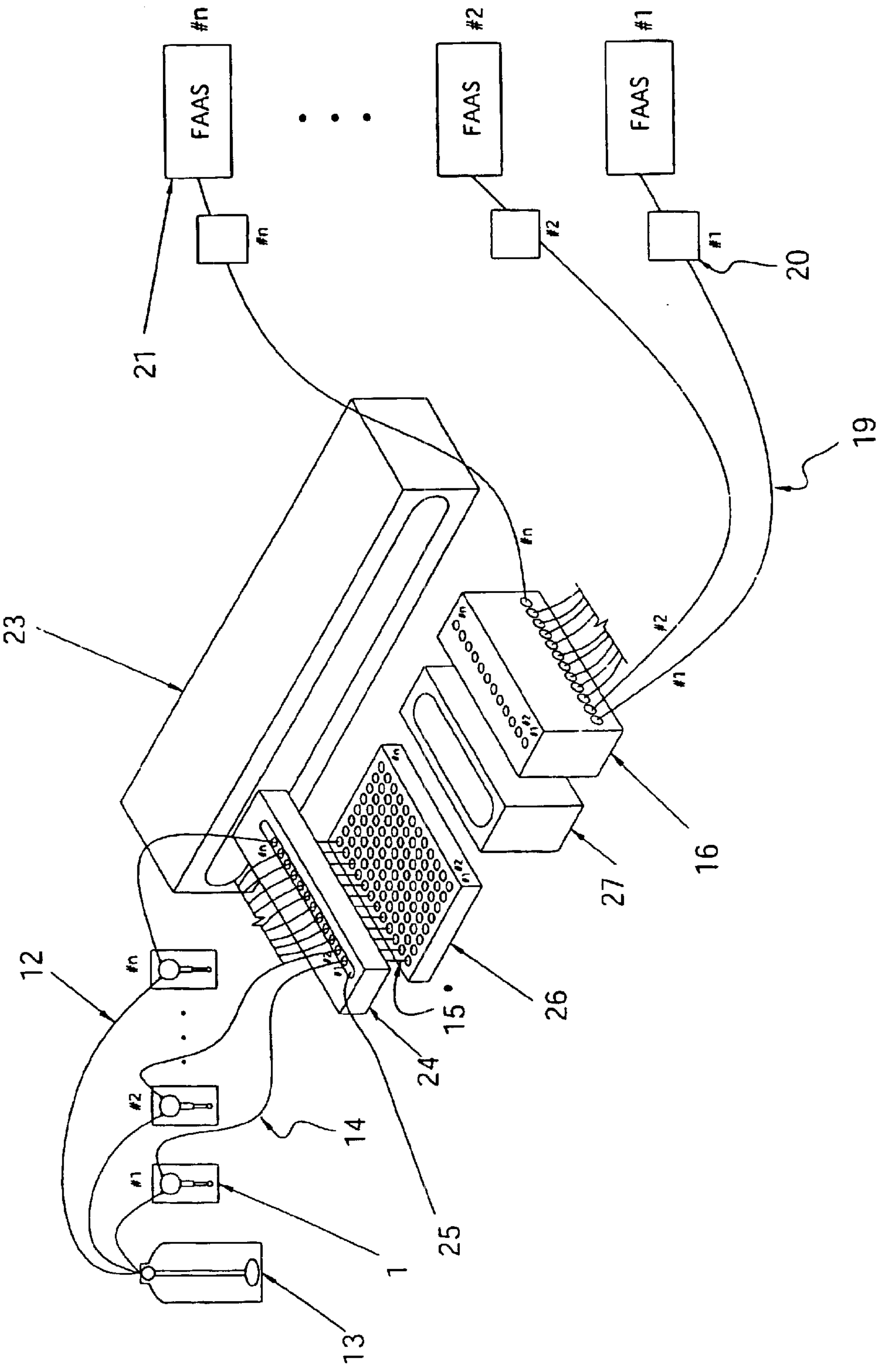
FIG. 1 is a schematic diagram of the apparatus if there were n channels of the apparatus arranged in parallel.

The apparatus, as depicted in FIG. 1, consists of an electronically controlled microsyringe pump 1, a diluent/wash container 13, an autosampler 23, a sample microplate 26, an array of solution containers (for standards, modifiers, buffers, suppressors, etc.) 27, an injection port 16, and a chemical analysis instrument (most likely, but not exclusively, a FAAS instrument) 21. The different components of the system are connected by tubing, allowing solutions to be exchanged between the various components of the system: from the diluent/wash container 13 to the microsyringe pump 1 via the diluent/wash tubing 12, from the microplate 26 and solution containers 27 into the sample tubing 14, and from the injection port 16 to the nebulizer 20 and chemical analysis instrument 21 via injection tubing 19.

Figure 2A:
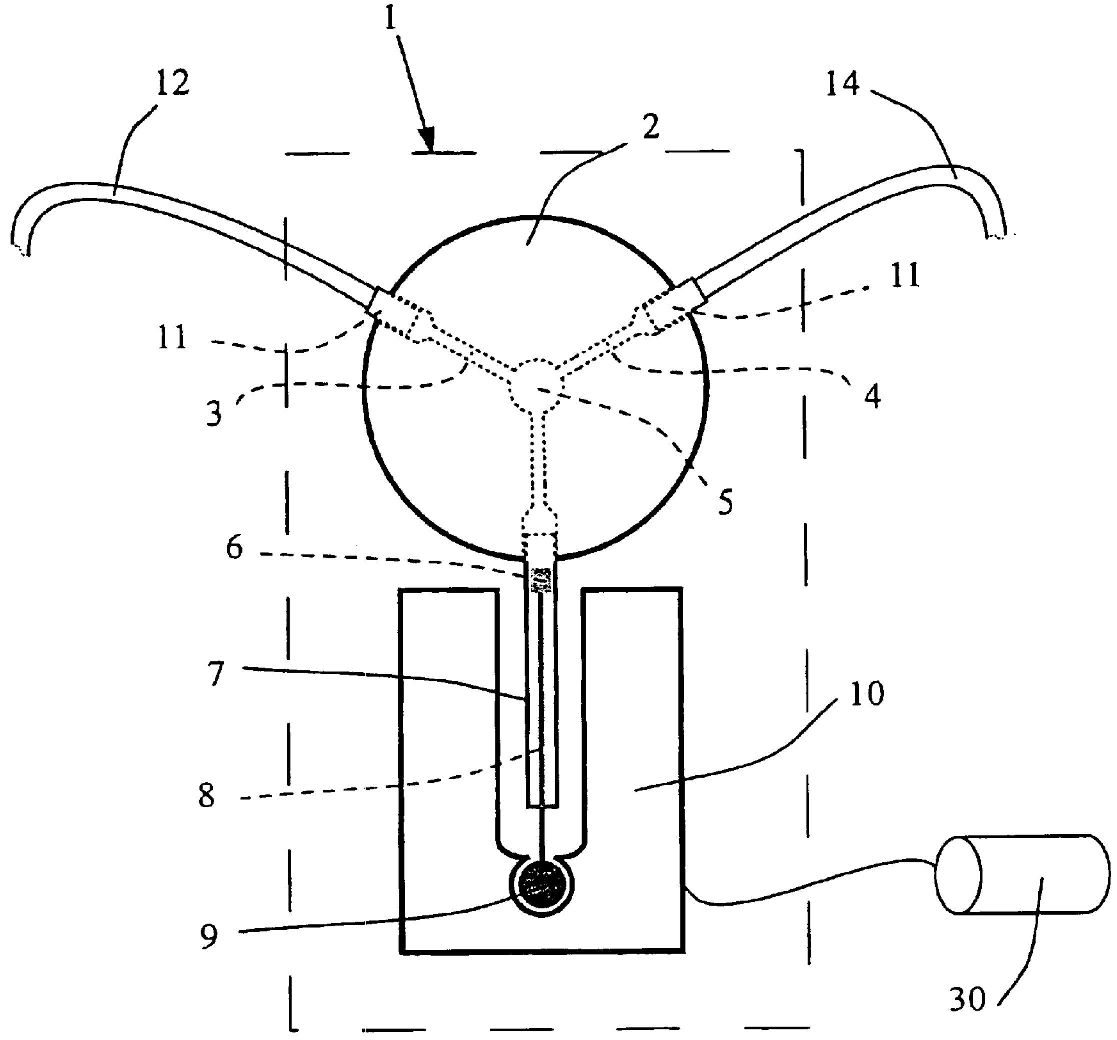
FIG. 2*a* is a view of the microsyringe pump showing the syringe plunger in the pushed up position.
Figure 2B:
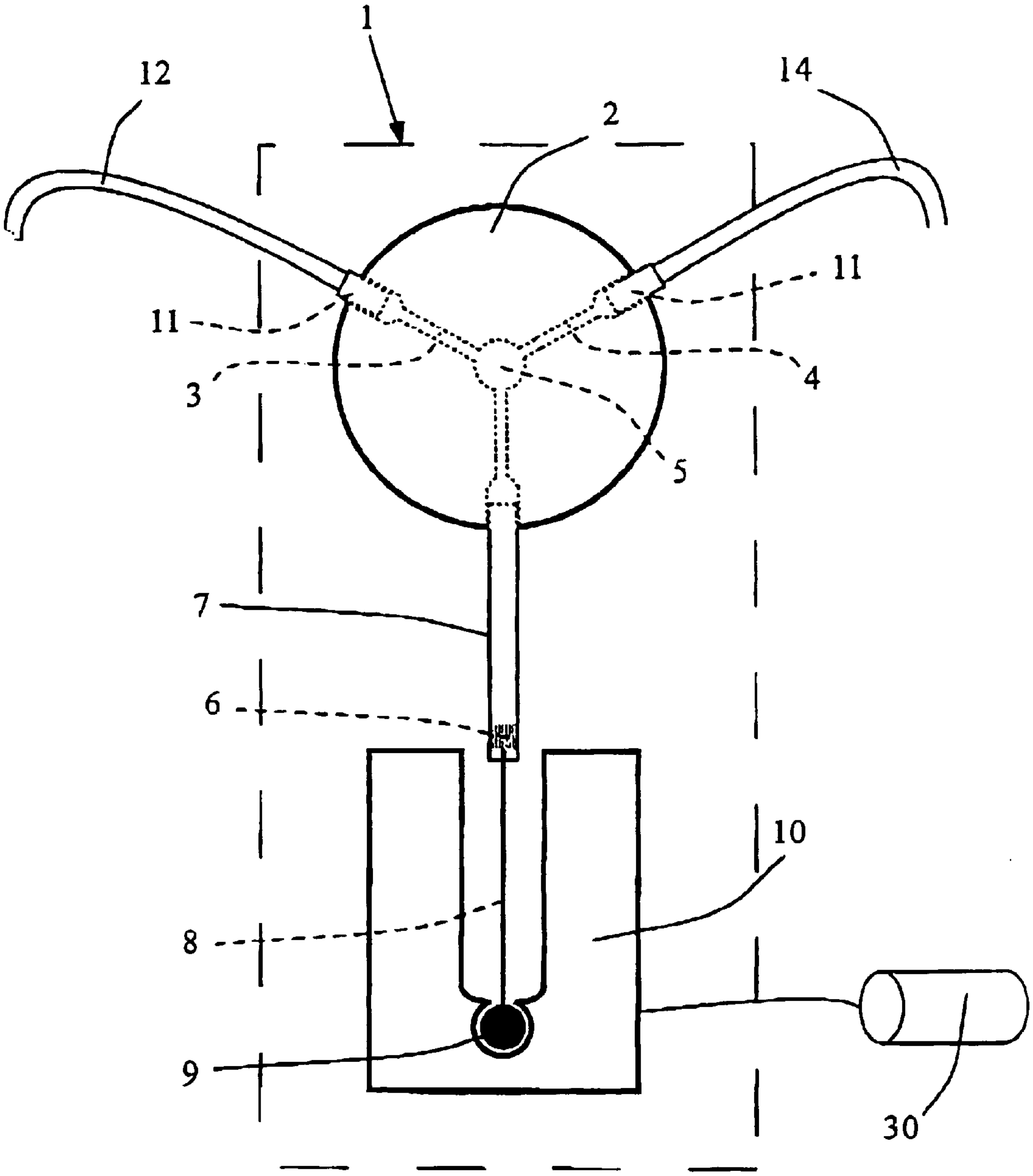
FIG. 2*b* is a view of the microsyringe pump showing the syringe plunger in the pulled down position.

Referring to FIGS. 2*a* and 2*b* the microsyringe pump 1 consists of a traditional vertical syringe barrel 7 with a movable internal plunger (plunger head 6, plunger arm 8, and plunger stem 9). The plunger stem sits in a groove in a mount 10 that moves up and down, thus moving the syringe plunger up and down inside the syringe barrel 7. Movement of the mount 10 is controlled by a computer controlled motor 30, such as an electric or stepping motor.

Figure 3:
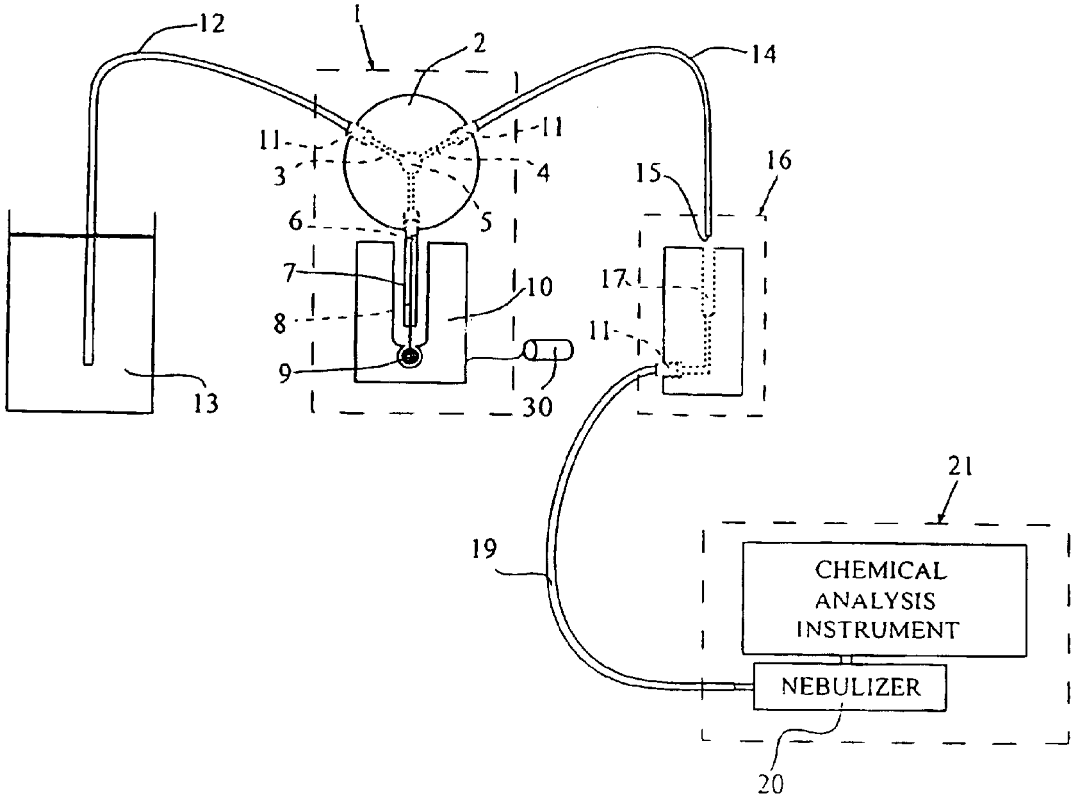
FIG. 3 is a schematic diagram of the apparatus, including the microsyringe pump, the wash/diluent solution container, the injection port, and the chemical analysis instrument.

Referring to FIG. 3 at the open end of the syringe barrel is a switchable 2-way valve 2 that has a central Y-junction 5. One path (wash/diluent path 3) through the 2-way valve is connected, via tubing (wash/diluent tubing 12), to a container that contains the wash/diluent 13. The other path (sample path 4) through the valve also has tubing (sample tubing 14) connected to it, but the end is not permanently fixed to anything, and so is free to aspirate whatever solution it is dipped into. The tubing end, therefore, is referred to as a sampling tip 15. Only one of the paths through the 2-way valve 2 can be open at any one time. That is, the valve can either be open between the wash/diluent 13 and the syringe barrel 7 (wash/diluent path 3), or be open between the sampling tip 15 and the syringe barrel 7 (sample path 4). The computer controls the position of the 2-way valve. Both tubing leads from the 2-way valve 2 are fixed to the outlets of the valve paths with threaded plastic fittings 11.

Referring to FIG. 1, the sampling tip 15 is connected to a housing 25 on the movable arm 24 of an autosampler 23, and through the autosampler movements the sampling tip 15 can be positioned to aspirate various different solutions.

Referring to FIG. 3 the sample mixtures are delivered to the chemical analysis instrument 21 via the injection port 16. The sample channel 17 has an inlet channel drilled vertically through the block of the injection port 16 from the top side, and has an outlet bored in horizontally from the side of the block to join with the vertical bore hole. Tubing is connected to the outlet of the sample channel 17 by a plastic fitting 11, and this injection tubing 19 is connected to the nebulizer 20 of the chemical analysis instrument 21.

Figure 4:
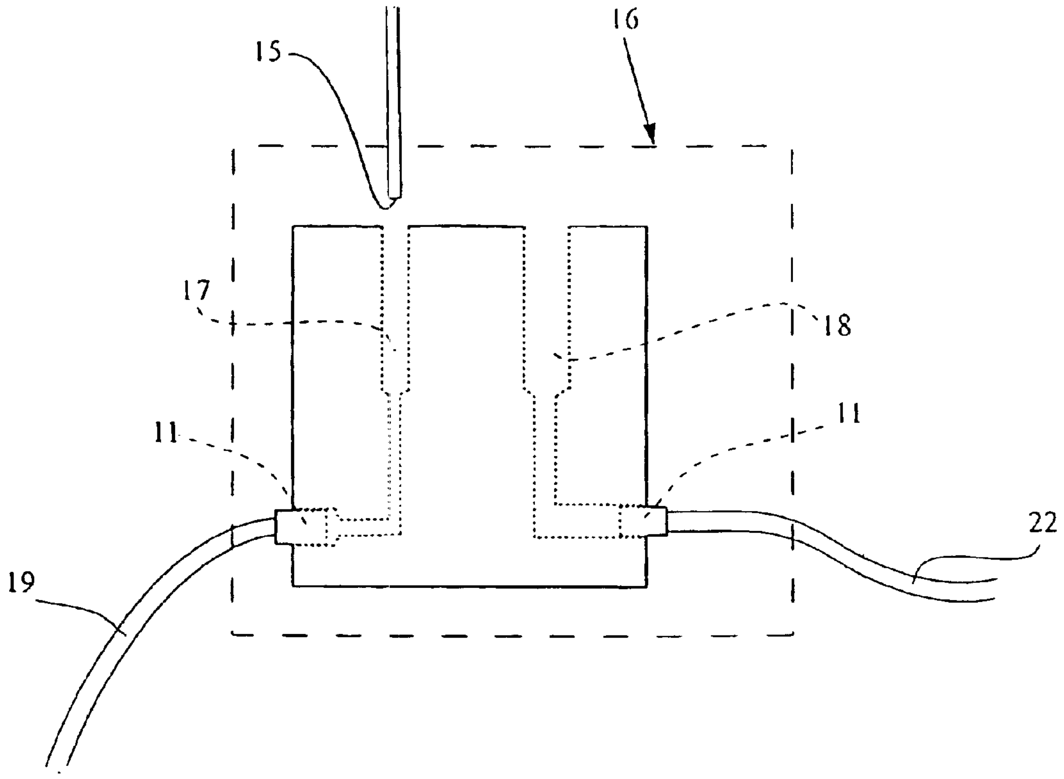
FIG. 4 is a view of an alternative embodiment of an injection port having two channels.

Alternatively, referring to FIG. 4 a wash channel 18 may be located next to the sample channel 17. Tubing is also connected to the outlet of the wash channel 18 by a plastic fitting 11, and this wash tubing 22 can be directed into a drain or a waste solution container. The wash channel is useful for large washes of the sample tubing 14.

While this description illustrates the invention using a FAAS chemical analysis instrument 21, the methodology is equally applicable to any chemical analysis technique that can accommodate a liquid sample introduction, including: atomic fluorescence spectrometry, inductively coupled plasma atomic emission spectroscopy, inductively coupled plasma mass spectrometry, gas chromatography, high performance liquid chromatography, graphite furnace atomic absorption spectroscopy, and electrothermal vaporization atomic absorption spectroscopy.

Data

Attached is data analyzing rubidium samples using the apparatus as described. Referring to TABLE 1, ten replicate analyses were performed on 1.00 ppm Rb samples illustrating the precision of the apparatus. Referring to TABLE 2, the analysis of 1.00 ppm Rb was replicated over a period of months illustrating the stability of the apparatus.

TABLE 1

| Ten Sample Replicate Analysis of 1.00 ppm Rb standard Solution | |
|---|---|
| Sample (n) | [Rb] ppm |
| 1 | 0.99 |
| 2 | 0.96 |
| 3 | 0.97 |
| 4 | 0.97 |
| 5 | 0.96 |
| 6 | 0.96 |
| 7 | 0.94 |
| 8 | 0.96 |
| 9 | 0.99 |
| 10 | 0.98 |
| Mean | 0.968 |
| Standard Deviation | 0.015492 |
| Coefficient of Variance | 1.600406% |

TABLE 2

| Replicate Analysis of 1 ppm Rb Standard Solution | |
|---|---|
| Date | 100 μL Sample Volume [Rb] ppm |
| 20-June | 1.04 |
| 11-July | 0.97 |
| 27-July | 1.03 |
| 27-July | 1.03 |
| 27-July | 0.98 |
| 20-August | 1.05 |
| 11-September | 1.02 |
| 11-September | 1.04 |
| 13-September | 1.02 |
| 28-September | 0.98 |
| 1-October | 1.03 |
| Mean | 1.02 |
| Standard Deviation | 0.028 |
| Coefficient of Variance | 2.7% |

Method of Using the Apparatus

The cycle of the sample preparation and delivery consists of several steps that are performed in sequence. An outline of one cycle is described below.

Step 1—Aspirate Wash and Diluent

According to the pre-programmed application, the 2-way valve 2 in the microsyringe is switched open to the stock wash/diluent solution 13. For most applications, the solution that is used to dilute samples will be the same solution that is used to wash the tubing and apparatus. The syringe plunger stem 9 is pulled and the wash solution 13 is aspirated. The piston is pulled enough so that a predetermined amount of wash is pulled past the Y-junction 5 in the switchable 2-way valve 2 and into the syringe barrel 7. The 2-way valve 2 is then switched to open to the sample path 4.

Step 2—Aspirate Modifier(s)/Other Agent(s)/Sample

The autosampler 23 then moves the sampling tip 15 to the desired stock solution container location (within the array of solution containers 27), and the desired modifier/suppressor/other agent is aspirated into the sampling tip tubing 15 by the piston action of the microsyringe pump 1. This process is repeated for as many other agents that are specified by the autosampler program. At this point there is the wash/diluent solution 13 in the syringe barrel 7 and some modifier(s)/suppressor(s)/other agent(s) in the end of the sample tubing 14.

The autosampler 23 may then move the sampling arm 24 to the microplate 26 well location with the sample of interest. A pre-programmed quantity of the sample is aspirated in the sampling tip 15 by the piston action of the microsyringe pump 1. At this point, there is the diluent/wash solution 13 in the syringe barrel 7 and in the sampling tubing 14 there is the collective mixture, which consists of: other agent(s) (farthest from the sampling tip 15), followed by the sample (just inside the sampling tip 15). Although the sample is aspirated last in this example, the order of aspiration may be modified.

Step 3—Dispense Sample Mixture

The moveable arm 24 of the autosampler 23 then moves the sampling tip 15 to the injection port 16, where the mixture is rapidly ejected from the sampling tip 15 by the piston action of the microsyringe pump 1. The syringe plunger 8 only moves enough to eject the sample mixture but retains the wash/diluent solution 13 in the sampling tubing 14. The rapid ejection of the sample mixture, combined with the design of the basin of the sample path 17 through the injection port 16, allows the components of the sample mixture to thoroughly mix before they are aspired out of the injection port 16 and into the nebulizer 20. The outlet of the injection port is connected to the nebulizer 20 of the chemical analysis instrument 21 by tubing (injection tubing 19). The injection tubing 19 is fixed to the outlet of the injection port by a threaded plastic fitting 11. The nebulizer 20 will typically draw the sample from the injection port by aspiration.

Step 4—Wash Apparatus

After a specified, measured period of time the syringe plunger 8 then pushes further and ejects the wash out of the sampling tubing 14 and into the sample channel 17 of the injection port 16. This ejection of the wash solution rapidly and simultaneously performs the tasks of washing the sampling tubing 14, the sample channel 17 of the injection port 16, and the nebulizer 20. At this point the sampling cycle is complete and the apparatus can begin the cycle again for the next sample.

An alternative washing step would involve a relatively large volume flush of wash solution 13 through the sample tubing 14, which would be dispensed into the wash channel 18 of the injection port 16, instead of into the sample channel 17.

Online Dilutions and Calibrations

This invention also performs the functions of online dilutions and calibrations from a single standard. Online dilution of a sample is sometimes needed when the concentration of the sample is outside the working range of the chemical analysis instrument 21. In such cases, the microsyringe pump 1 can be programmed to aspirate a specific amount of diluent 13 that, when mixed with the sample, will produce a sample mixture that is in the working concentration range of the chemical analysis instrument 21. This online dilution method does not require any extra steps in the sampling cycle (and so takes no more time than usual), and improves the accuracy, precision, and reliability of the measurement made by the chemical analysis instrument. As well, the online dilution procedure dilutes the sample just enough so that it is within the concentration range of the chemical analysis instrument, and the sensitivity of the measurement is therefore optimized.

A calibration from a single standard is a specific variation of an online dilution. An entire calibration curve (spanning the entire working range) can be constructed from a single bulk standard. For example, to measure the bulk standard solution at full strength (no dilution), the microsyringe pump would simply aspirate no diluent. For example, 0 μL of diluent 13 and 200 μL of standard (aspirated from a contained located in the array of solution container 27). The measurement of this undiluted standard would create one data point for the calibration curve. In the next sample cycle, the microsyringe pump 1 would aspirate a small volume of diluent 13 before aspirating the standard, in order to dilute the standard. For example, 30 μL of diluent and 170 μL of standard (to maintain constant sample mixture volume). The resulting sample mixture would have only 85% the concentration of the previous, undiluted sample mixture. The measurement from this diluted sample mixture would provide another data point for the calibration curve. The next sample cycle could aspirate a sample mixture that is even more diluted (say, 60% of the original standard concentration), and therefore add another data point to the calibration curve. This process of online dilutions of the single standard solution is continued until the preprogrammed number of calibration curve data points has been obtained, at which point the calibration curve is complete.

High Throughput Sampling

This invention can also be used to attain high throughput sampling by having multiples (n) of the sampling apparatus (e.g. a dozen, but not limited to that number) set up into parallel channels. Such sampling apparatus is depicted in FIG. 1. A multi-channel setup with n channels would consist of: n microsyringe pumps 1, one common wash/diluent container 13, one autosampler 23, one common array of microplates 26, one common array of solution containers 27, one injection port manifold 16, and n chemical analysis instruments 21. For each microsyringe pump 1, the sampling tip 15 of the sampling tubing 14 would be connected to a common housing 25 on the movable arm 24 of the common autosampler 23; there would be a row of n sampling tips 15 on the movable arm 24. The injection port manifold 16 would have n separate and distinct injection ports (one dedicated for each channel). The array of solution containers 27 would each be trough-shaped (long and narrow) to allow the entire row of n sampling tips 15 to be dipped into an individual container at the same time. The sampling program of each apparatus operates independently of the others, so that each cycle of the apparatus can potentially prepare n unique samples for analysis.

The sampling tips of each apparatus are all connected to the same moving arm of an autosampler. Beyond this, each of the n sampling apparatus channels would operate independently of the others, so that each cycle of the apparatus could prepare multiple (and potentially unique) samples for chemical analysis. So, while one may draw up a common solution, another may not (depending on the preprogrammed application of each sampling apparatus) even though all apparatus are in the position to do so. The theory, function, and use of each channel in such a multi-channel system would be identical to the theory, function, and use of the single channel system described in this invention; the only difference would be in the physical number of systems.

Since there are multiple sampling channels (e.g. one dozen), there are as many injection ports (in the sample port manifold) and as many chemical analysis instruments to analyze the prepared samples. A single channel system (i.e. one sampling apparatus and one spectroscopic device) can analyze samples at a rate of 4 samples/minute, or 240 samples/hour. If 12 channels, for example, were incorporated into the system, then the sample throughput would increase to 48 samples/min, or 2880 samples/hour.

This microsample analysis method is not limited to a single microplate 26 of samples. Multiple microplates could be used to accommodate more samples and to reduce down time while microplates 26 are being switched. Further, the capacity of the wells of the microplates 26 may vary, for example there may be 96 wells with 360 uL/well, 384 wells with 50 uL/well, or 1536 wells with 10 uL/well.

Accordingly, while this invention has been described with reference to illustrative embodiments, this description is not intended to be construed in a limiting sense. Various modifications of the illustrative embodiments, as well as other embodiments of the invention, will be apparent to persons skilled in the art upon reference to the description. It is therefore contemplated that the appended claims will cover any such modifications or embodiments as fall within the true scope of the invention.

What I claim as my invention is:

1. A system for delivering small liquid samples to an analyzer, said system comprising at least one delivery channel, said delivery channel including:

(a) an electro-mechanically controlled microsyringe pump having a plunger slidably moveable in sealing contact with a barrel, said pump operative to aspirate and eject a sample liquid;

(b) a tube in fluid communication with said barrel, said tube including a two-way valve having a first path and a second path; and (c) an injection port having an input and an output, said input operative to receive and mix said sample liquid, and said output couplable to said analyzer;

wherein said first path is coupled to a diluent liquid tube, said diluent liquid tube operative to channel a diluent liquid into said barrel; and wherein said second path is coupled to a sample liquid tube, said sample liquid tube operative to take up said sample liquid, to deliver said sample liquid to said injection port, and to deliver said diluent liquid to said input of said injection port.

2. The system according to claim 1, wherein movement of said plunger is controlled by an electric motor.

3. The system according to claim 2, wherein said electric motor is computer controlled.

4. The system according to claim 1, wherein movement of said plunger is controlled by a stepping motor.

5. The system according to claim 4, wherein said stepping motor is computer controlled.

6. The system according to claim 1, further comprising a second injection port couplable to a drain.

7. The system according to claim 1, including a nebulizer coupled to said output of said injection port and said analyzer coupled to an outlet of said nebulizer.

8. The system according to claim 7, wherein said analyzer is a flame atomic absorption spectroscopy instrument.

9. The system according to claim 1, wherein said diluent liquid is operative to wash said sample liquid tube, said injection port, and said analyzer after analysis of said sample liquid.

10. The system according to claim 1, wherein said sample liquid tube is operative to deliver a predetermined amount of said diluent liquid to said injection port so as to dilute said sample liquid.

11. The system according to claim 10, wherein said injection port is operative to mix said diluent and said sample liquid.

12. The system according to claim 1, wherein one of said first and second paths can be alternately placed in fluid communication with said barrel.

13. The system according to claim 12, wherein a computer controls switching between said first path and second path.

14. The system according to claim 1, wherein said sample liquid is held by a microplate.

15. The system according to claim 14, further comprising an autosampler having a moveable arm coupled to said sample liquid tube, wherein said moveable arm is operative to move said sample liquid tube between said microplate and said injection port.

16. A method for delivering small sample mixtures to an analyzer, said method comprising:

(a) providing a system for delivering small liquid samples to an analyzer, said system comprising an electromechanically controlled microsyringe pump having a plunger slidably moveable in sealing contact with a barrel, said pump operative to aspirate and eject a sample liquid, and a tube in fluid communication with said barrel, said tube including a two-way valve having a first path and a second path, said first path coupled to a diluent liquid tube, said second path coupled to a sample liquid tube, and an injection port having an input and an output, said input operative to receive and mix said sample liquid, and said output couplable to said analyzer;

(b) aspirating a diluent liquid into said diluent liquid tube through said first path into said barrel;

(c) aspirating a sample liquid into said sample liquid tube;

(d) injecting said sample liquid into said input of said infection port;

(e) delivering said sample liquid from said output of said injection to said analyzer;

(f) injecting said diluent liquid from said barrel through said second path into said sample liquid tube to said input of said injection port.

17. The method according to claim 16, wherein said sample liquid is held by a microplate.

18. The method according to claim 17, further comprising an autosampler having a moveable arm coupled to said tube, wherein said moveable arm is operative to allow said tube to be moved between said microplate and said injection port.

19. The method according to claim 16, wherein movement of said plunger is controlled by an electric motor.

20. The method according to claim 19, wherein said electric motor is computer controlled.

21. The method according to claim 16, wherein movement of said plunger is controlled by a stepping motor.

22. The method according to claim 21, wherein said stepping motor is computer controlled.

* * * * *